US011429842B2

(12) United States Patent
Wang et al.

(10) Patent No.: US 11,429,842 B2
(45) Date of Patent: Aug. 30, 2022

(54) NEURAL NETWORK FOR SKELETONS FROM INPUT IMAGES

(71) Applicant: Microsoft Technology Licensing, LLC, Redmond, WA (US)

(72) Inventors: Lijuan Wang, Bellevue, WA (US); Kevin Lin, Seattle, WA (US); Zicheng Liu, Bellevue, WA (US); Kun Luo, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 796 days.

(21) Appl. No.: 16/396,513

(22) Filed: Apr. 26, 2019

(65) Prior Publication Data
US 2020/0272888 A1 Aug. 27, 2020

Related U.S. Application Data

(60) Provisional application No. 62/809,688, filed on Feb. 24, 2019.

(51) Int. Cl.
*G06T 7/10* (2017.01)
*G06N 3/04* (2006.01)
(Continued)

(52) U.S. Cl.
CPC ........... *G06N 3/0454* (2013.01); *G06F 17/15* (2013.01); *G06N 3/08* (2013.01); *G06T 7/10* (2017.01);
(Continued)

(58) Field of Classification Search
CPC .................. G06V 40/10; G06V 40/103; G06T 2207/10004; G06T 2207/10028; G06T 2207/10048; G06T 7/10
See application file for complete search history.

(56) References Cited

U.S. PATENT DOCUMENTS 11,048,942 B2 * 6/2021 Yun ........................... G06T 7/20
11,074,711 B1 * 7/2021 Akbas ................ H04N 5/23229
(Continued)

OTHER PUBLICATIONS

Fabbri, et al., "Learning to Detect and Track Visible and Occluded Body Joints in a Virtual World", In Proceedings of The European Conference on Computer Vision (ECCV), 2018, pp. 450-466.
(Continued)

*Primary Examiner* — Sean T Motsinger
(74) *Attorney, Agent, or Firm* — Alleman Hall Creasman & Tuttle LLP

(57) ABSTRACT

A computing system is provided. The computing system includes a processor configured to execute a convolutional neural network that has been trained, the convolutional neural network including a backbone network that is a concatenated pyramid network, a plurality of first head neural networks, and a plurality of second head neural networks. At the backbone network, the processor is configured to receive an input image as input and output feature maps extracted from the input image. The processor is configured to: process the feature maps using each of the first head neural networks to output corresponding keypoint heatmaps; process the feature maps using each of the second head neural networks to output corresponding part affinity field heatmaps; link the keypoints into one or more instances of virtual skeletons using the part affinity fields; and output the instances of the virtual skeletons.

20 Claims, 15 Drawing Sheets

(51) Int. Cl.
*G06N 3/08* (2006.01)
*G06F 17/15* (2006.01)
*G06V 40/10* (2022.01)

(52) U.S. Cl.
CPC .. *G06V 40/103* (2022.01); *G06T 2207/10004* (2013.01); *G06T 2207/10028* (2013.01); *G06T 2207/10048* (2013.01)

(56) References Cited

U.S. PATENT DOCUMENTS

| | | | |
|---|---|---|---|
| 11,106,902 B2* | 8/2021 | Li | G06V 40/10 |
| 2020/0082635 A1* | 3/2020 | Zhu | G06K 9/00 |
| 2020/0151903 A1* | 5/2020 | Lee | G06T 7/73 |
| 2020/0184846 A1* | 6/2020 | Zhang | A61B 5/1116 |
| 2020/0272888 A1* | 8/2020 | Wang | G06N 3/08 |
| 2020/0298080 A1* | 9/2020 | Zhang | G06N 3/08 |

OTHER PUBLICATIONS

Girshick, et al., "Deep Learning for In stance-level Object Understanding", Retrieved From: http://deeplearning.csail.mit.edu/instance_ross.pdf, Jul. 21, 2017, 61 Pages.

Kocabas, et al., "MultiPoseNet: Fast Multi-Person Pose Estimation Using Pose Residual Network", In Proceedings of The European conference on computer vision (ECCV), 2018, pp. 437-453.

"International Search Report and Written Opinion Issued in PCT Application No. PCT/US20/015504", dated May 25, 2020, 11 Pages.

* cited by examiner

DEFINE PARTS LOCALIZATION AND ASSOCIATIONS

18 KEYPOINTS 46
Nose – 0
Neck – 1
Right Shoulder – 2
Right Elbow – 3
Right Wrist – 4
Left Shoulder – 5
Left Elbow – 6
Left Wrist – 7
Right Hip – 8
Right Knee – 9
Right Ankle – 10
Left Hip – 11
Left Knee – 12
Left Ankle – 13
Right Eye – 14
Left Eye – 15
Right Ear – 16
Left Ear – 17
Background – 18

19 PAFs 50
0-1, 1-2, 2-3, 3-4, 1-5, 5-6, 6-7, 1-8, 8-9,
9-10, 1-11, 11-12, 12-13, 0-14, 14-16, 0-15,
(Not used for linking: 2-16, 5-17)

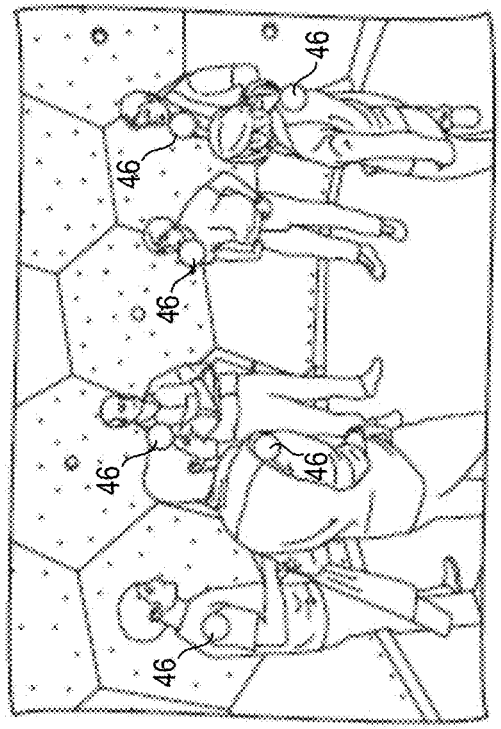
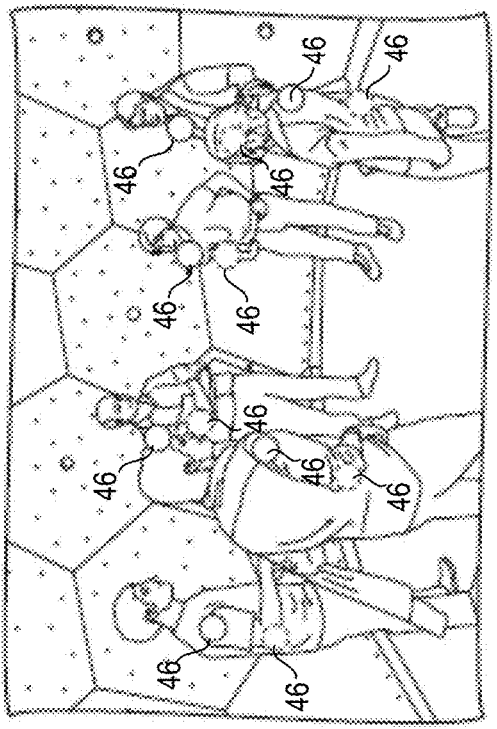
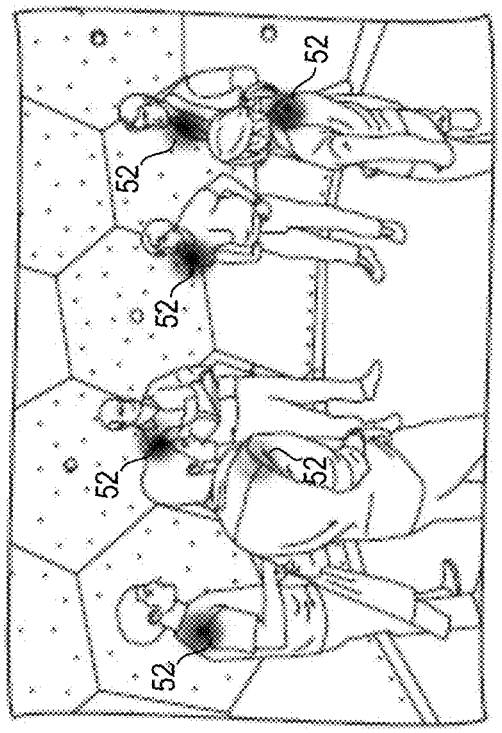
FIG. 7A  FIG. 7B  FIG. 7C  FIG. 7D

NEURAL NETWORK FOR SKELETONS FROM INPUT IMAGES

CROSS REFERENCE TO RELATED APPLICATIONS

This application claims priority to U.S. Patent Application Ser. No. 62/809,688, filed Feb. 24, 2019, the entirety of which is hereby incorporated herein by reference for all purposes.

BACKGROUND

The field of computer vision presents an array of potential problems on which developers may seek to improve. Segmentation in images involves determining which pixels are assigned to figures, such as in pictures that include human bodies. Estimation of human poses in images has also been a challenge in the field of image analysis and computer vision. Determining the skeletons of bodies in an image may be performed at multiple scales or for moving bodies in video. For multi-person pose estimation, the challenge may be compounded compared to a single-person pose estimation. Various algorithms and computational approaches have been developed to solve different aspects of estimation. These challenges are addressed by the computing system described herein.

SUMMARY

A computing system is provided. The system may include a processor and associated memory. The processor may be configured to execute one or more programs stored in the memory to execute a convolutional neural network that has been trained using a training data set. The convolutional neural network may include a backbone network, a plurality of first head neural networks, and a plurality of second head neural networks. The backbone network may be a concatenated pyramid network. At the backbone network, the processor may be configured to receive an input image as input and output feature maps extracted from the input image. The processor may be configured to process the feature maps using each of the first head neural networks to thereby output corresponding keypoint heatmaps that may indicate a probability that each pixel in the input image belongs to a corresponding one of a plurality of keypoints. Each of the first head neural networks may have been trained to determine the probability that each pixel in the input image belongs to one of the plurality of keypoints.

The processor may be further configured to process the feature maps using each of the second head neural networks to thereby output corresponding part affinity field heatmaps that may indicate a probability that each pixel in the input image belongs to a corresponding one of a plurality of part affinity fields. Each of the second head neural networks may have been trained to determine the probability that each pixel in the input image belongs to one of the plurality of part affinity fields. The processor may be configured to link the plurality of keypoints into one or more instances of virtual skeletons using the plurality of part affinity fields, and output the one or more instances of the virtual skeletons.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 7A-7G show an example implementation of outputting skeletons from an input image according to one example of the present disclosure.

DETAILED DESCRIPTION

In general, approaches to solving the problem of human pose estimation in images have included "top-down" methods that execute single-person pose estimation for each of multiple human figures in an image and "bottom-up" methods that may detect human body parts to be associated with each other to construct full figures. "Top-down" approaches to multi-person pose estimation, while potentially highly accurate, may involve considerable computational expense. "Bottom-up" approaches, in contrast, may dispense with a step of recognizing human bodies and creating bounding boxes and instead employ body part recognition and association. As neural networks may be trained on image data sets to recognize body parts, the "bottom-up" approach may be amenable to the use of neural networks. While the "top-down" methods may offer accuracy, the "bottom-up" methods may require less runtime, even with an increasing number of human figures in an image. However, even for "bottom-up" methods that are known to be more efficient, computational costs may be high due to detection and estimation processes. While the "bottom-up" approach may have certain advantages over a "top-down" approach, building a system for multi-person pose estimation that is generally accurate, efficient, and fast presents a challenge for developers.

The inventors have conceived of a computing system to address this challenge that includes single-stage, single-scale detection estimation of multi-person poses. While other systems for multi-person pose estimation have employed neural networks, known solutions may use multiple stages of prediction via neural networks and image detection at multiple scales to achieve multi-scale estimation of poses. Instead, the inventors have developed a system using a backbone network for learning human pose representations and extracting feature maps in conjunction with network heads that execute a single stage of prediction and that may execute at a single scale to accomplish multi-scale estimation of poses. Specific example implementations of this general approach are discussed below.

Figure 1:
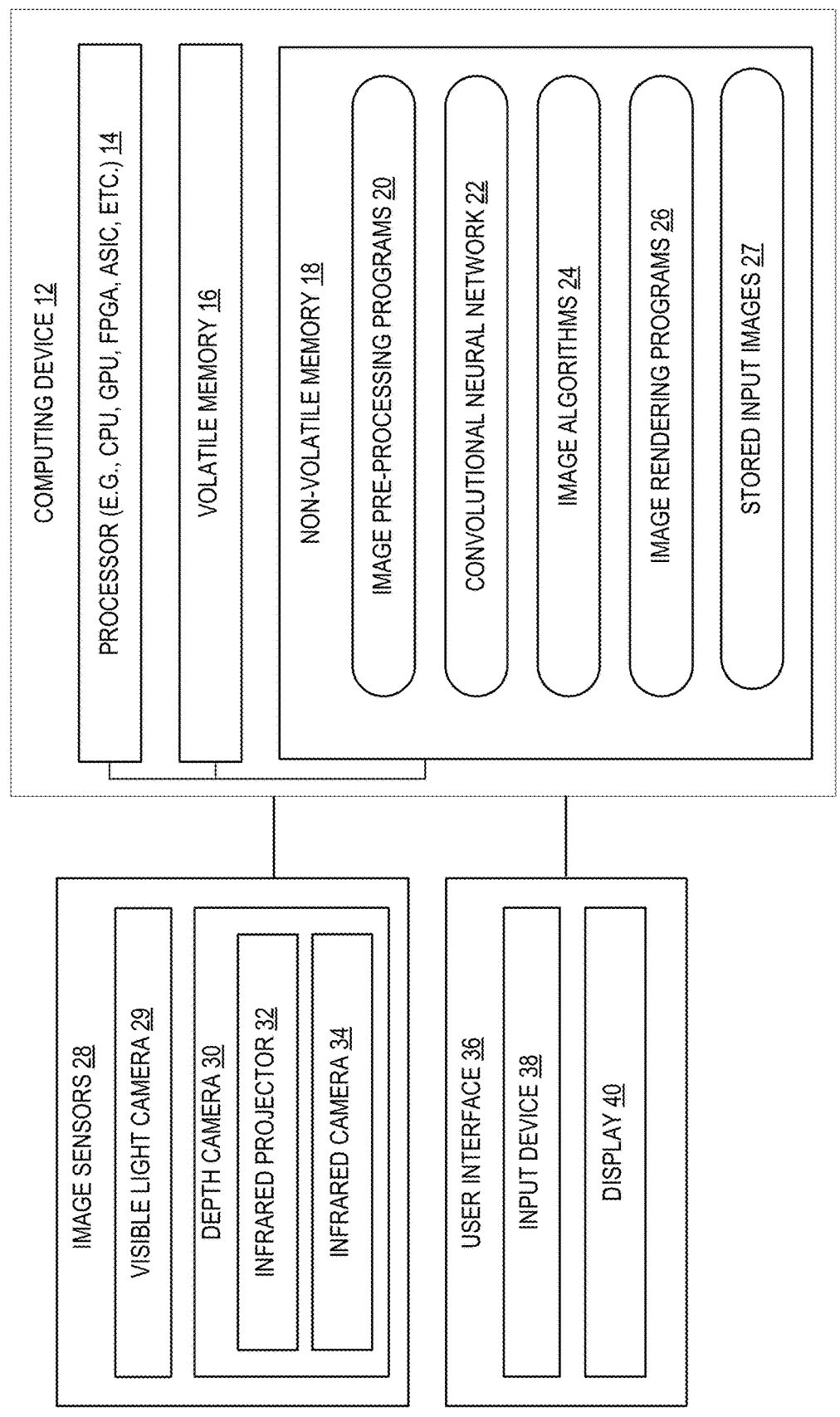
FIG. 1 shows a computing system according to an example implementation of the present disclosure in a computing device.

FIG. 1 shows a computing system 10 according to an example implementation of the present disclosure. The computing system 10 may include a processor 14 and associated memory, which in FIG. 1 is depicted as volatile memory 16 and non-volatile memory 18 in a computing device 12. The processor 14 may be a GPU, CPU, FPGA, ASIC, and so on, and may be configured to execute one or more programs stored in the non-volatile memory 18. These programs and the data they utilize may include image pre-processing programs 20, convolutional neural network (CNN) 22, image algorithms 24 for statistical analysis such as non-maximum suppression (NMS), image rendering programs 26 for the output of image processing by the CNN 22. Input images 27 may additionally be stored in the non-volatile memory 18.

One or more image sensors 28 may be provided to capture input images 27. The image sensors 28 may include a visual light camera 29 that may include one or more charge-coupled devices (CCD) and/or complementary metal-oxide-semiconductor (CMOS) sensors, for example. The image sensors 28 in addition or alternatively may also include a depth camera 30 that may be of an infrared time-of-flight type that may include an infrared (IR) projector 32 and an IR camera 34. Alternatively, the depth camera 30 may be of a stereoscopic type and may include a plurality of visible light cameras. The computing device 12 may be configured to receive visible light image data, for example in RGB format, from the visible light camera 29 for processing. The computing device 12 may also be configured to receive depth maps from depth camera 30 and active brightness (AB) maps from an IR camera such as IR camera 34. Computing system 10 may be equipped to process, via image sensors 28, input images 27 that are real-time images captured and received in real-time. Alternatively, computing system 10 may be configured to read input images 27 that have been stored in non-volatile memory 18, processing the stored images as input instead of or in addition to input images 27 that are real-time. It will be appreciated that a user interface 36 may also be connected to the computing device 12 that may include an input device 38 such as a keyboard and a display 40 for user interaction with the computing device 12 and to display image output of the computing system 10.

Figure 2:
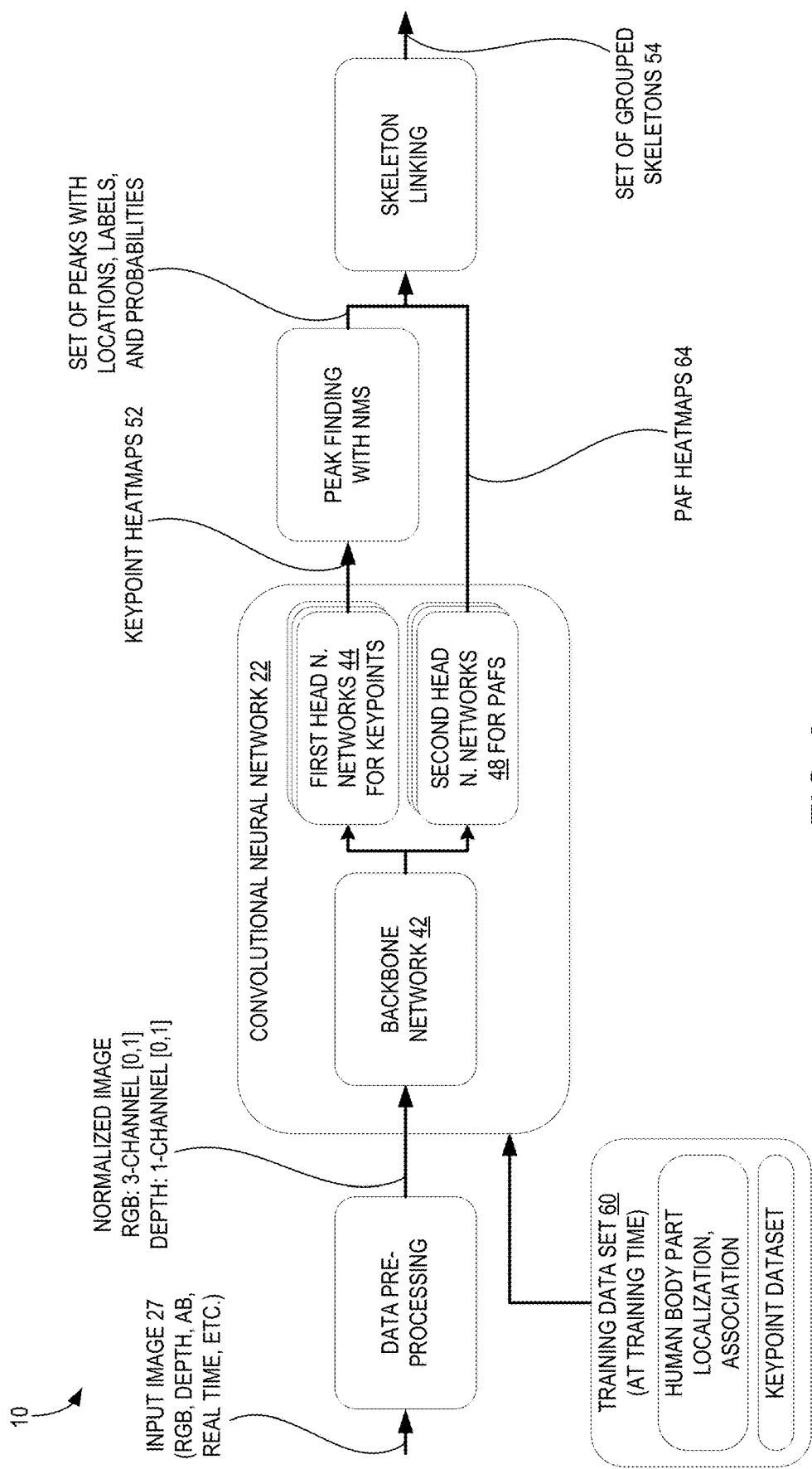
FIG. 2 shows a computing system according to an example implementation of the present disclosure.
Figure 3:
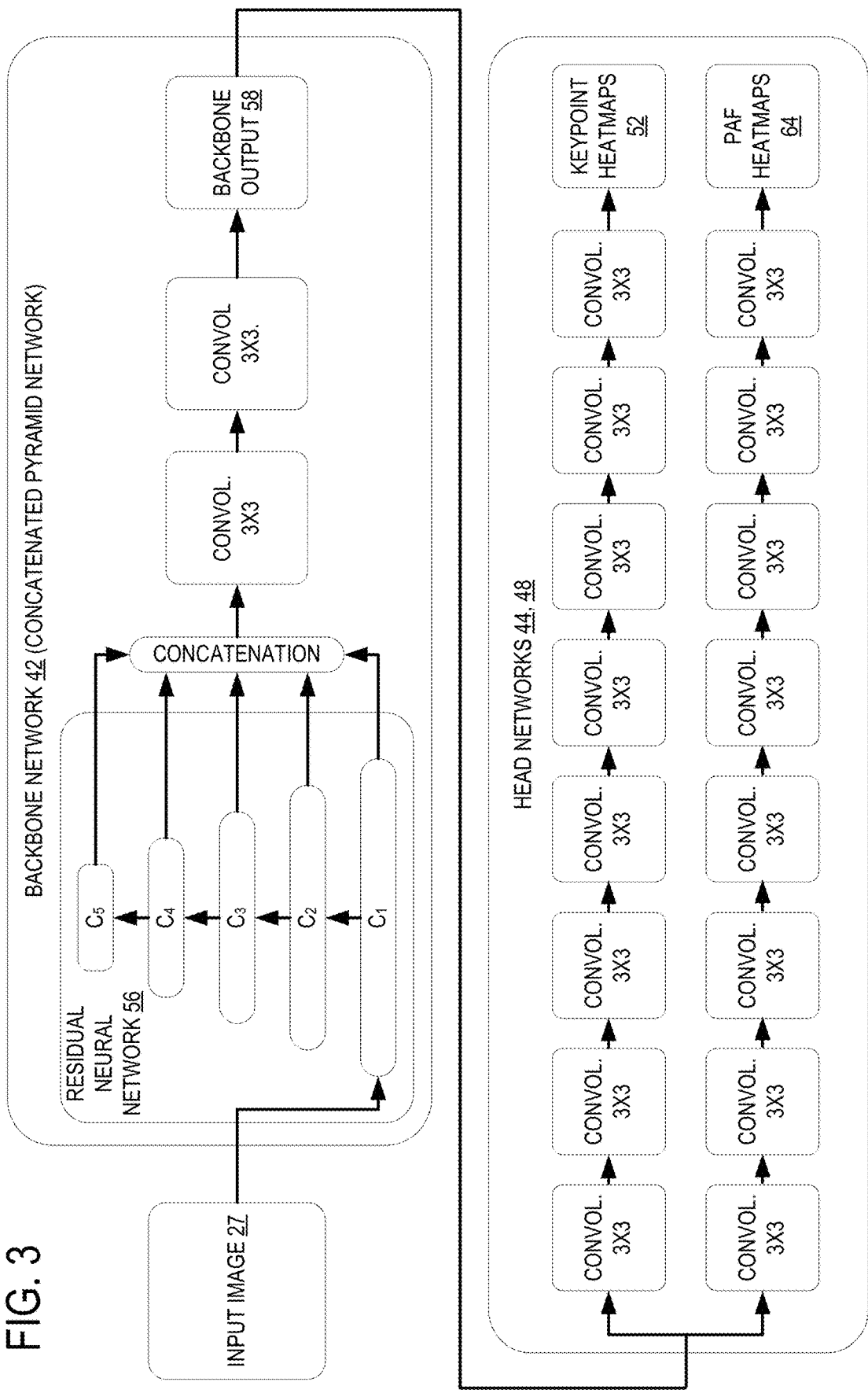
FIG. 3 is a detailed schematic of a convolutional neural network of the computing system of FIG. 2, according to one example of the present disclosure.

Turning now to FIG. 2, the processor 14 may be configured to execute one or more programs stored in the memory to execute a CNN 22 that has been trained using a training data set 60. From the training process, the CNN 22 may learn human part localization and association. As an outcome of training, the backbone network 42 may output feature representations synthesized from the learning process. The CNN 22 may include a backbone network 42, a plurality of first head neural networks 44, and a plurality of second head neural networks 48. The backbone network 42 may be a concatenated pyramid network (CCPN), which may be configured with deep pyramid network architecture. As shown in FIG. 3, the CCPN may include a residual neural network (RNN) 56 including a plurality of intermediate layers that may be configured as convolutional neural network layers. In FIG. 3, these intermediate layers include $C_1$ to $C_5$; each successive layer from $C_1$ to $C_5$ may include fewer nodes or neurons. The plurality of intermediate layers may be connected on a downstream side to a concatenation layer, followed by a plurality of convolutional layers, in this order. It will be appreciated that an output layer may also be included.

Returning to FIG. 2, at the backbone network 42, an input image 27 that may include multiple human bodies may be received as input. The input image 27 may include one or more of visible light image data, depth data, and active brightness data, which may include input received from a visible light camera, a depth camera, or an infrared camera. The input may be real-time input as well. Thus, to name a few examples, the input image 27 may include color image data such as RGB data captured from a visible light camera, depth data (referred to herein as a depth map), and/or active brightness (AB) data from raw infrared (IR) images (referred to herein as an AB map) from an infrared camera. The input image 27 may be pre-processed to produce a normalized image, which may include normalization over three color channels for an RGB image and over one channel for a depth map, for example. Pre-processing of image data may include additional steps to prepare the image data for processing by a neural network.

As the CCPN learns body part localization and association, feature maps may be extracted from input images. Feature maps from the intermediate layers $C_1$ to $C_5$ may be concatenated as input to downstream convolutional layers. The intermediate layers in the CCPN may be concatenated to preserve the information flows between different scales and different levels of semantics. The size of different feature maps may be normalized by adopting deconvolution operations, where the deconvolution kernels may be optimized during learning. Subsequently, the upsampled feature maps may be concatenated along the channel axis. The concatenated feature maps may be fed into subsequent convolutional layers, from which the multi-scale feature representations may be distilled. In contrast to applying the element-wise summation, concatenating the multi-scale features simultaneously may preserve the semantic information at different scales and enrich the variation of the input at the subsequent head networks 44, 48. This also may improve the learning efficiency. This difference may be a major difference between the computing system 10 and known feature pyramid networks. Backbone output 58 from the backbone network 42, as indicated in FIG. 3, may thus include the feature maps extracted from the input image 27.

Returning to FIG. 2, the processor 14 may be further configured to, at the CNN 22, process the feature maps using each of the first head neural networks 44 to output corresponding keypoint heatmaps 52 indicating a probability that each pixel in the input image 27 belongs to a corresponding one of a plurality of keypoints 46. Each of the first head neural networks 44 may have been trained to determine the probability that each pixel in the input image 27 belongs to one of the plurality of keypoints 46. The plurality of first head neural networks 44 and the plurality of second head neural networks 48 may each include a fully convolutional neural network including a plurality of convolutional layers.

In the example implementation of FIG. 3, each head network 44, 48 is a convolutional neural network including a plurality of convolutional layers. Although eight convolutional layers are illustrated, another number of convolutional layers may be used as appropriate.

Figure 4:
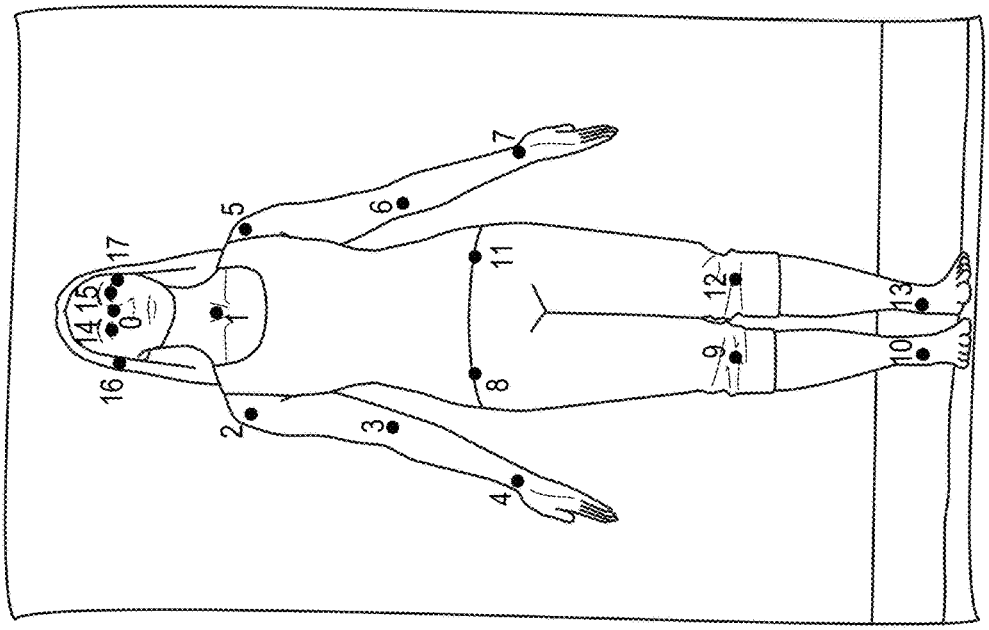
FIG. 4 shows an example of keypoints and part affinity field connections that may be used by the computing system of FIG. 2.

In order to execute skeleton linking, body parts may need to be localized and associations learned by the computing system 10 between keypoints 46 of body parts, as shown in FIG. 4. Keypoints 46 may be associated with corresponding body parts, e.g., shoulders, knees, eyes, hips, etc. The keypoint heatmaps 52 may function as confidence maps that probabilistically divide pixels into designations 0 and 1 of belonging to a particular keypoint 46. As shown in FIG. 4, one implementation may include 18 keypoints 46 (19 keypoints when the background is included); thus, 18 keypoint heatmaps 52 corresponding to each respective keypoint 46 may be generated by the first head neural networks 44. As shown in FIG. 2, the keypoint heatmaps 52 may be fed to a program executing an edge detector, which may execute edge thinning using a technique such as non-maximum suppression (NMS). This additional processing may output a set of peaks for the keypoints 46 that identify locations of keypoints 46 with labels and associated probabilities for each of the keypoints 46 to be a body part.

Continuing with FIG. 2, the processor 14 may be further configured to, at the CNN 22, process the feature maps using each of the second head neural networks 48 to output corresponding part affinity field heatmaps 64 indicating a probability that each pixel in the input image 27 belongs to a corresponding one of a plurality of part affinity fields (PAFs) 50. Each of the second head neural networks 48 may have been trained to determine the probability that each pixel in the input image 27 belongs to one of the PAFs 50. The PAFs 50 may determine fields of pixels identified with body segments.

Figure 5B:
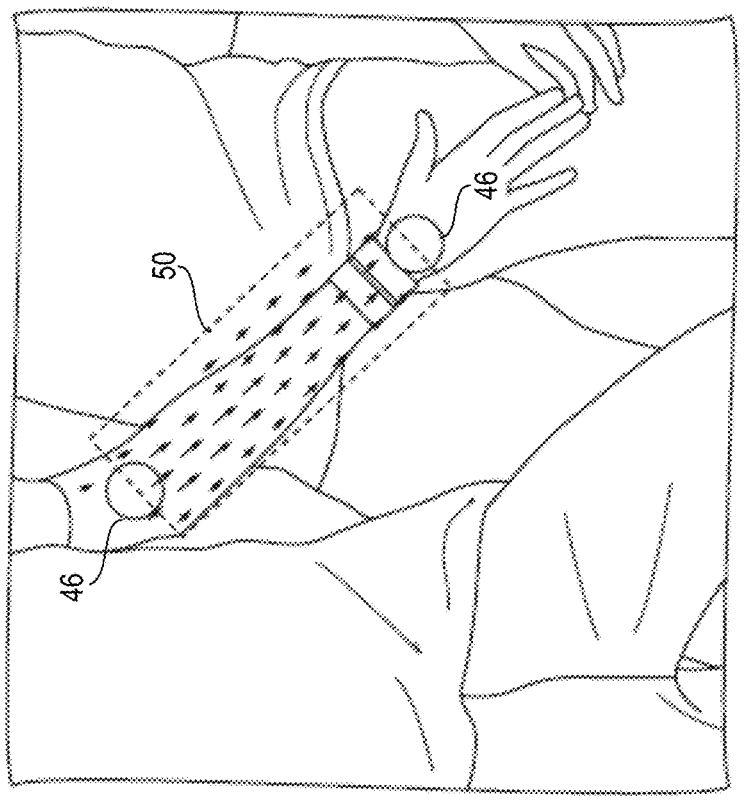
FIGS. 5A and 5B show an example implementation of part affinity fields for a body segment according to one example of the present disclosure.
Figure 5A:
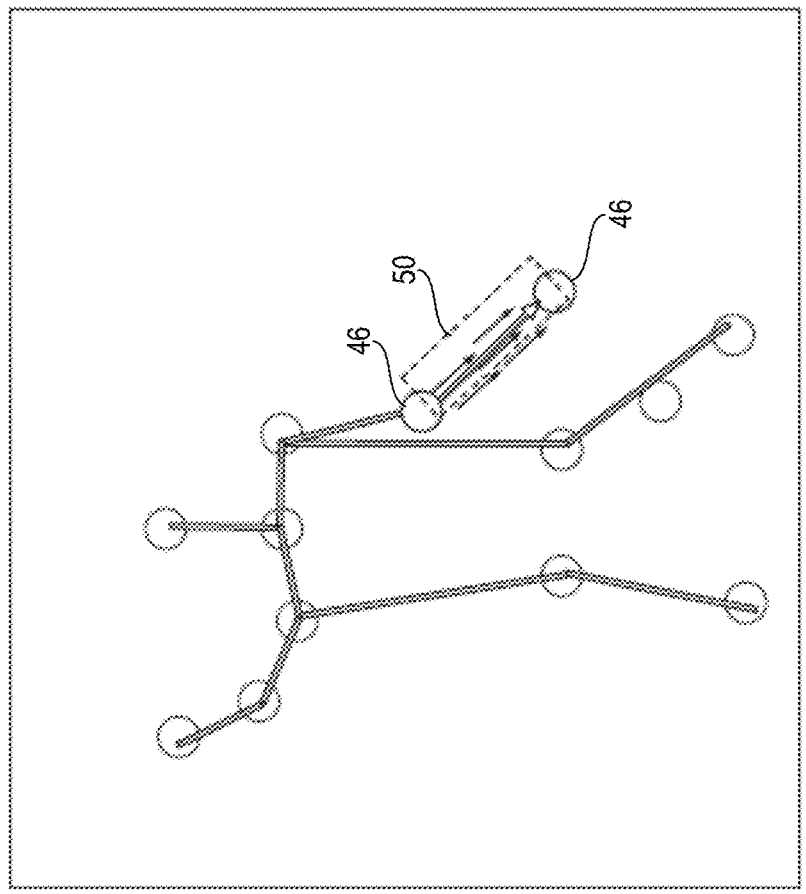

FIGS. 5A and 5B depict an example implementation of PAFs 50 for a body segment. In the figures, a unidirectional vector field that is the PAF 50 in this implementation is shown between two keypoints 46, one at the left elbow and one at the left wrist. Computationally, two vector fields antiparallel to each other and between the same two keypoints 46 may be computed and combined to compute each PAF 50, as determination of the vector fields may proceed first from one direction and secondly from the opposite direction. For example, the PAF 50 may be determined from a shoulder to an elbow, then from the elbow to the shoulder. The final PAF 50 may be unidirectional for the sake of subsequent linking of parts, the output PAF 50 representing a summed unit vector field going only from, for example, the shoulder to the elbow. A length of a vector in the PAF 50 may represent confidence of pixel assignment while the direction of the vector may be associated with the linking direction. Stated differently, the length of the vectors in the vector field may be sized to represent the confidence that each portion of the PAF accurately represents the position of the body part with which the PAF is associated. Thus, the vectors at the edges of the vector field in FIG. 5B are smaller than the vectors toward the inside of the vector field. The boundary of the vector field represents the boundary of the associated body part. The overall area of the PAF 50 may represent the predicted linkage. One potential advantage of this configuration is that the PAF prediction process may avoid wrong connections between keypoints 46.

In the example of FIG. 4, 19 PAFs 50 may be computed where 19×2 PAF heatmaps 64 are generated, two for each PAF 50 that each account for a vector field in one of the two antiparallel directions between given pairs of keypoints 46. In this implementation, 19 PAFs 50 are employed, although, in this example, two are not used for subsequent skeleton linking. It will be appreciated that the vector field is typically formed in a rectangle extending from an origin keypoint to a logically adjacent (i.e., directly linked) keypoint in the virtual skeleton 54. Alternatively, the boundary of the vector field may be an ellipse or other shape besides a rectangle.

The computing system 10 may be configured to process the feature maps using the first head neural networks 44 and to process the feature maps using the second head neural networks 48 such that they are executed in parallel, the first head neural networks 44 and the second head neural networks 48 running concurrently. The running of the first and second head neural networks 44, 48 may occur, that is, in parallel in real time. The convolutional neural network may be trained for a single stage. The heatmaps 52 and PAFs 50 may be obtained from a single pass through the head networks 44, 48 that may be run in parallel. Thus, subsequent image processing to construct skeleton linking may proceed after a single stage of the CNN 22. One potential advantage of the parallel head networks over "bottom-up" human pose estimation processes, which may also include neural networks, is that image processing may be performed in a single-stage, that is, with one pass of the image data through the CNN 22. Consequently, processing time required to estimate human poses at runtime may be significantly diminished compared to currently human pose estimators involving neural networks.

Figure 6:
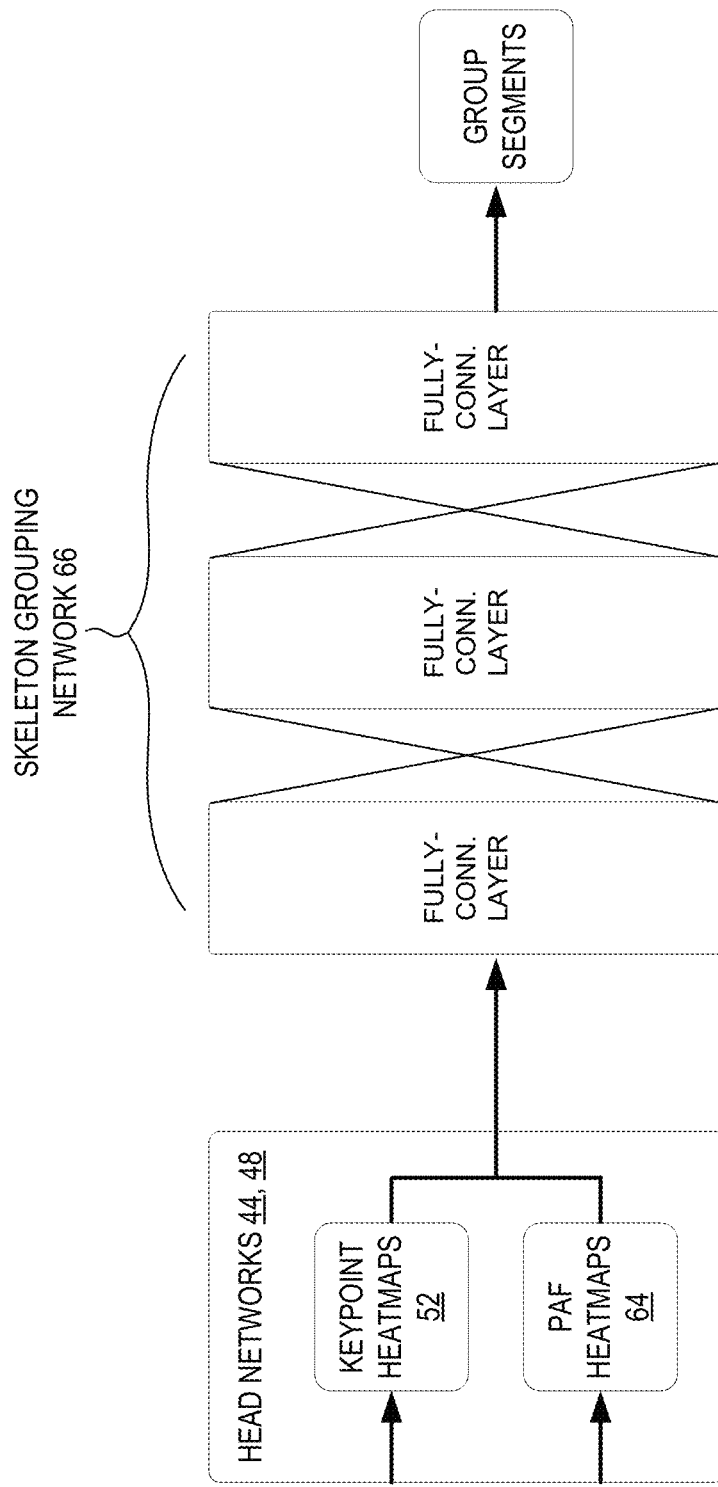
FIG. 6 is a schematic of a skeleton grouping network according to one example of the present disclosure.

FIG. 6 is a schematic of a skeleton grouping network according to one example. The processor 14 may be further configured to link the plurality of keypoints 46 into one or more instances of virtual skeletons 54 using the plurality of part affinity fields PAFs, and output the one or more instances of the virtual skeletons 54. The processed keypoint heatmaps 52 with peak sets and the PAF heatmaps 64 may be further processed to determine skeleton linking based on the probabilities associated with pixels of the keypoints 46 and PAFs 50. The processor 14 may be configured to execute the skeleton grouping network 66 that may include a plurality of fully-connected layers. The skeleton grouping network 66 may be configured to, from the keypoint heatmaps 52 and part affinity field heatmaps 64, group segments 68 of the one or more instances of the virtual skeletons 54. Linking the keypoints 46 may be performed by a greedy algorithm by fitting keypoint locations and part affinity field locations to form each instance of the one or more instances of the virtual skeletons 54. The greedy algorithm may be advantageous when grouping skeletons 54 in such cases as overlapping bodies, for instance. Linking the keypoints 46 may be repeated to maximize a total fitting score 72 for each instance of the one or more instances of the virtual skeletons 54. Examples of grouping the virtual skeletons 54 and overlapping bodies are further discussed below.

Figure 7F:
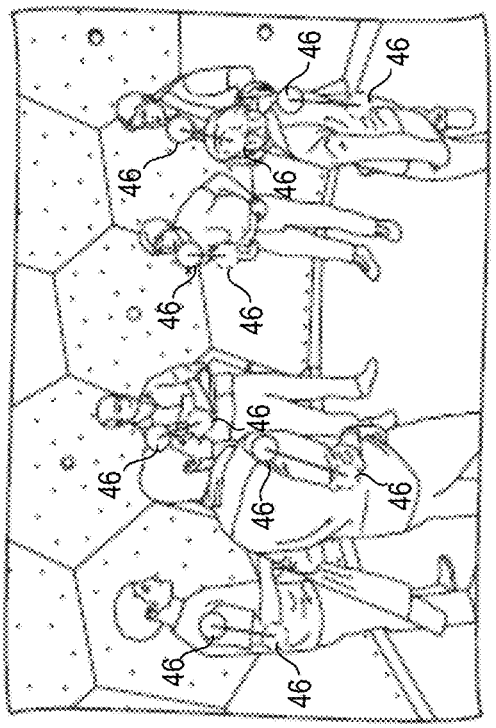

FIGS. 7A-7G depict an example of multi-person pose estimation generated with the computing system 10. In FIG. 7A, an input image 27 including human figures is shown. FIG. 7B shows the input image 27 with keypoints 46 for shoulders of the human bodies. FIG. 7C is an example of a keypoint heatmap 52 for the keypoints 46 of FIG. 7B. The keypoint heatmaps 52 represent a confidence map, as discussed above, for pixels that may be associated with the shoulder keypoints 46. In FIG. 7D, an additional keypoint 46 is shown for each body, which in this example is for estimation of the right elbow of each body. It will be appreciated that FIGS. 7B-7D represent the processing of the first head neural network 44 that processes keypoint heatmaps 52.

Figure 7E:
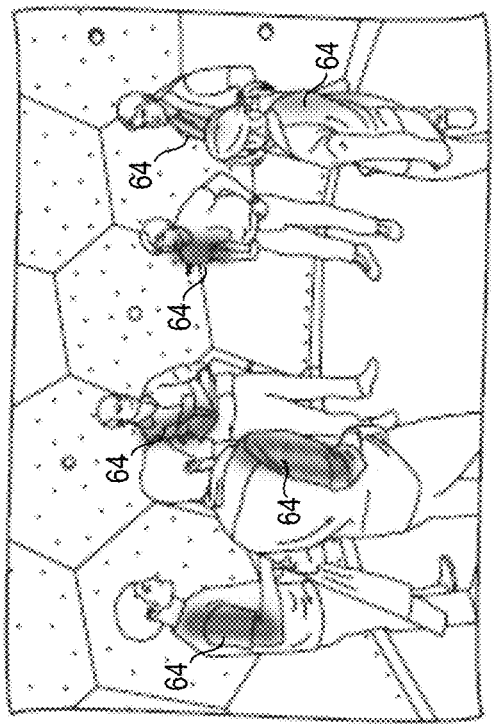
Figure 7G:
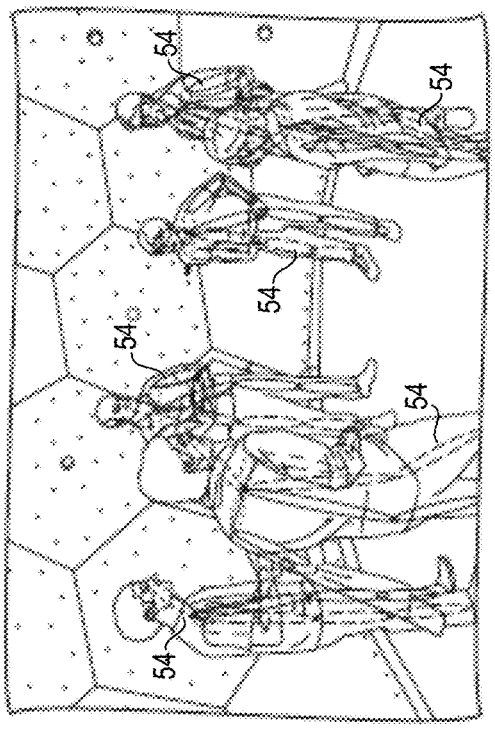

Functionally parallel to the first head neural network 44 is the second head neural network 48 that processes the PAF heatmaps 64. FIG. 7E shows the human figures of FIG. 7A with PAF heatmaps 64 for the segment 68 between the right shoulder and elbow keypoints 46. The intensity of each segment 68 may represent the confidence level for associating a respective pixel with the body segment. FIG. 7F depicts a step in linking the keypoints 46 of the right shoulder and right elbow of each body; as shown in FIG. 2, skeleton linking may be executed using the keypoint heatmaps 52 (in the case of FIG. 2, post peak finding with NMS) in conjunction with the PAF heatmaps 64. Ground truth PAFs may be utilized to establish a baseline segment. FIG. 7G depicts a final output of skeletal linking with an image of a set of grouped skeletons 54 for the input image 27.

The output of the virtual skeletons 54 may be as visual data added to the original input image 27; alternatively, the output of the virtual skeletons 54 may be a new image showing only the virtual skeletons 54, for example. The set of one or more grouped skeletons 54 may be used by downstream programs, such as augmented reality (AR) or virtual reality (VR) programs, to control the movement and action of in-program character representations (e.g., player character avatars), as one example.

Figure 8C:
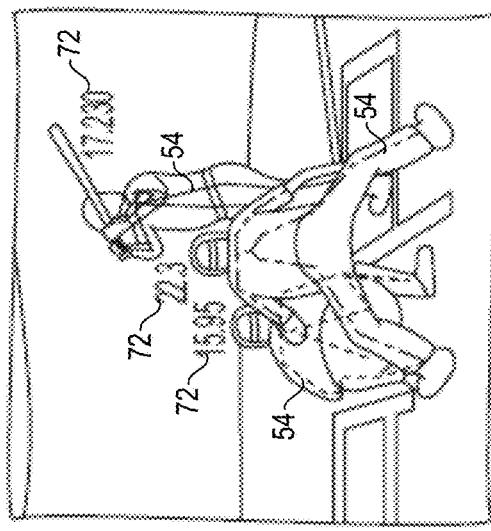
FIGS. 8A-8C show an example implementation of skeleton grouping for overlapping bodies according to one example of the present disclosure.
Figure 8B:
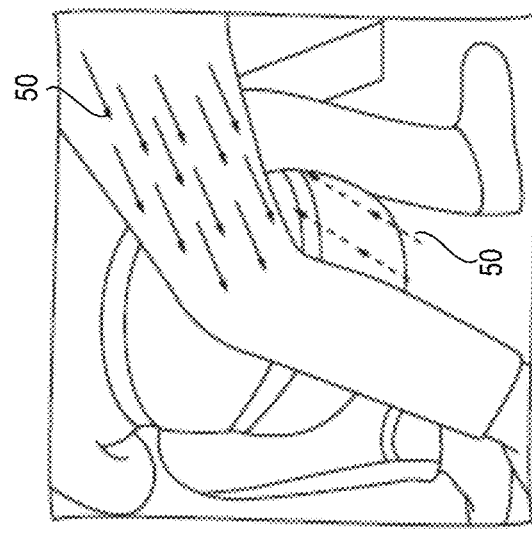
Figure 8A:
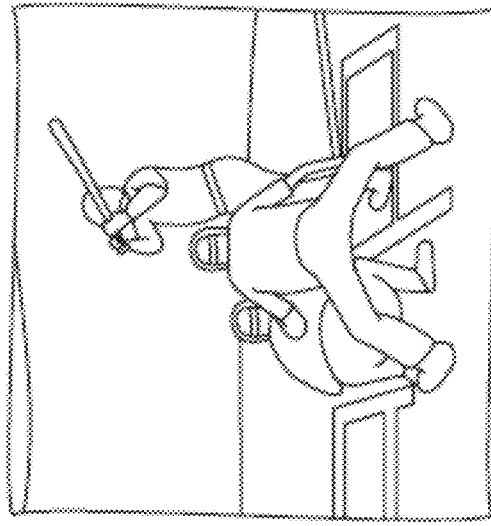

Turning now to FIGS. 8A-8C, the input image 27 may include overlapping bodies, where one or more parts of at least one body in the input image 27 are occluded by at least one additional body. FIG. 8A is an example input RGB image for human pose estimation that includes overlapping bodies. FIG. 8B shows one example of PAFs 50 that may be calculated for a portion of the bodies in FIG. 8A. In this image, the longer arrows pointing downward to the left bottom corner of the image represent greater confidence of association with the PAF 50, while the shorter arrows pointing to the top right corner of the image represent weaker confidence vectors. FIG. 8C depicts grouped skeletons 54 as output of the computing system 10. Also shown in FIG. 8C is the fitting score 72 for each skeleton 54, which, as discussed above, may be produced by the linking process of the computing system 10 to indicate a relative probabilistic strength of the fitted skeleton. One potential advantage of the computing system 10, as demonstrated in FIG. 8C, is that the skeletons 54 may be individually discerned in spite of the overlapping bodies. This outcome may result in part from generation of the PAFs 50 as described above and a linking of the PAFs 50 into skeletons 54 using a greedy algorithm for linking the PAFs 50. To more accurately handle overlapping bodies, the processor 14 may be further configured to receive, as input, a pair of skeletons and output a confidence score indicating a probability that each skeleton in the pair of skeletons belongs to a same body in the input image 27. For example, for the skeleton S and location of the body part P, for j body parts for each skeleton $S=\{P_1, P_2, \ldots, P_j\}$ where $P_e=0$ for a missing body part. The pair of skeletons may be represented as $\{S_p, S_q\}$. An output may include a confidence score indicating the likelihood that $\{S_p, S_q\}$ belongs to the same body. Thus, the system 10 may be configured to differentiate between overlapping bodies in the input image 27 as shown in FIG. 8C.

Figure 9:
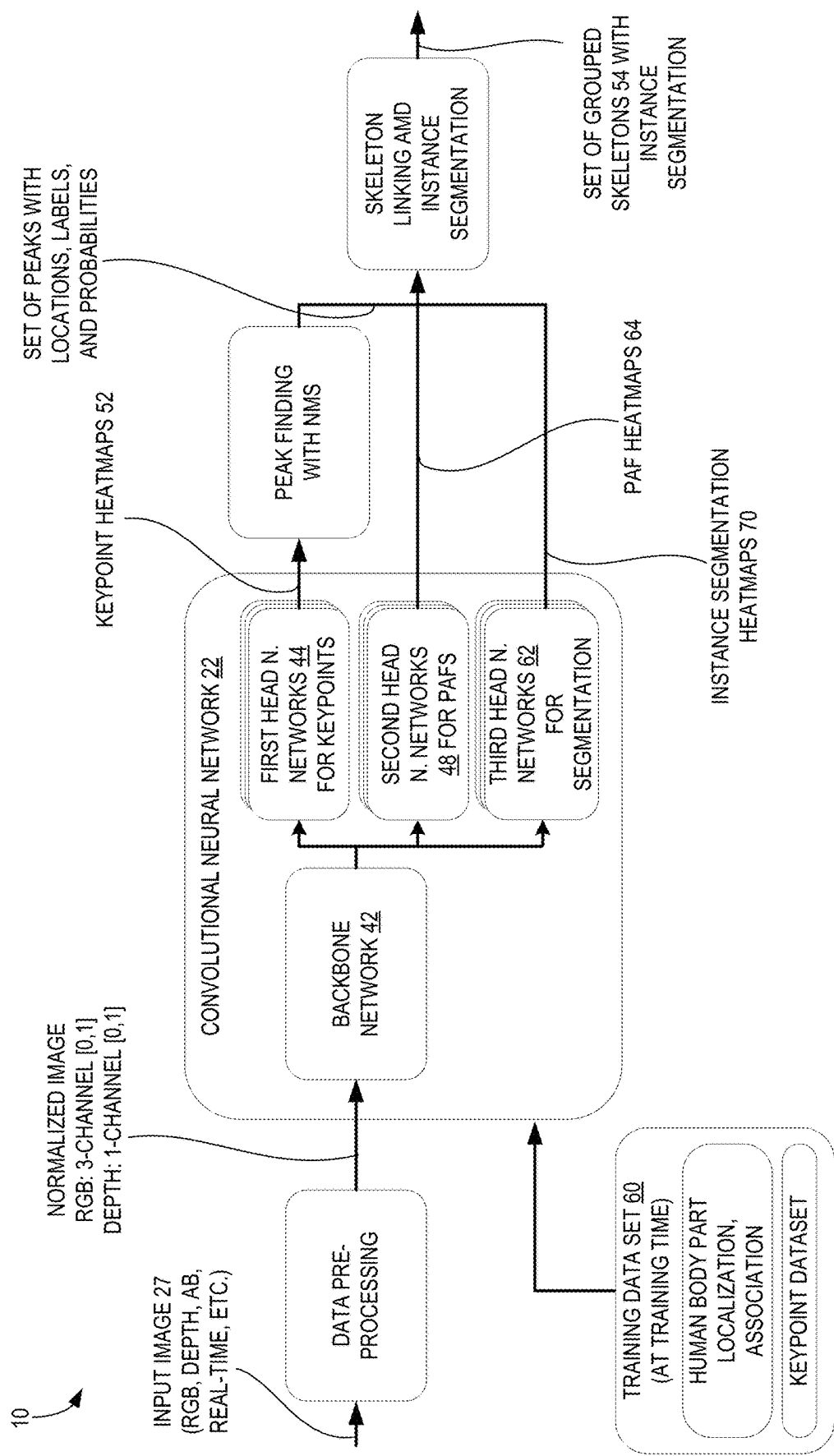
FIG. 9 is a schematic view of another implementation of a computing system according to the present disclosure.

Turning now to FIG. 9, the processor 14 may be configured to execute a plurality of third head neural networks 62 having been trained to determine a probability that each pixel in the input image 27 belongs to one of a plurality of segments 68. FIG. 9 depicts the computing system 10 similarly to FIG. 2 but with additional third head neural networks 62 for body part segmentation. In this implementation, visible light and/or IR images and/or depth images may also be received as input. At the third head neural networks 62, the feature maps may be processed using each of the third head neural networks 62 to output corresponding instance segmentation maps 70 for each segment 68 indicating the probability that each pixel in the input image 27 belongs to a corresponding one of the plurality of segments 68. In one example, part segmentation may be divided into 15 parts, thus 15 instance segmentation maps 70 may be generated. Using the instance segmentation maps 70, the processor 14 may be configured to determine instance segmentation for parts of the at least one body in the input image 27 and output the one or more instances of the virtual skeletons 54 with instance segmentation for parts of the at least one body.

Figure 10:
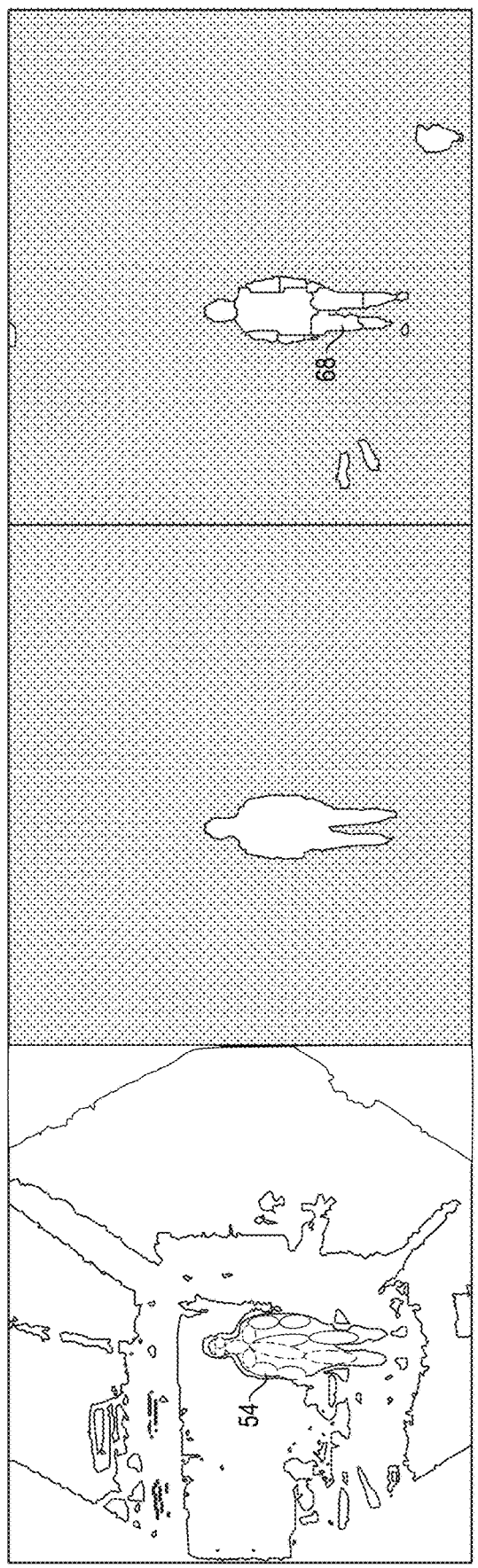
FIG. 10 shows an example implementation of instance segmentation for parts of a body according to one example of the present disclosure.

FIG. 10 shows an example implementation of instance segmentation and body parts segmentation that may be generated with the configuration of the computing system 10 illustrated in FIG. 9 and described above. The image of FIG. 10 is a processed depth map. At the left panel, a grouped skeleton 54 has been generated for the body in the depth map. In the center panel, instance segmentation for the body is illustrated. Instance segmentation for body parts may be accomplished with the third head neural network 62 (illustrated in FIG. 9) that may be devoted to determining segments 68 of body parts. In this case, instance segmentation for each segment 68 of the body parts may be generated as shown in the right panel of FIG. 10. It will be appreciated that in this example implementation of computing system 10, not only may pose estimation be accomplished from RGB images, IR images, and depth maps, but body part segmentation may be performed for depth maps and RGB and/or IR images as well. As discussed above, this information may be used by a downstream program as user input, for example, to control an aspect of the downstream program, such as a representation of one or more player characters in the downstream program. The representations of the one or more player characters controlled in this manner may be output for display on a display of the computing device 12.

The processor 14 may be configured so that the outputting of the one or more instances of virtual skeletons 54 from the input image 27 received in real time is output in real time. For example, if real-time images including human figures are input into the system 10, the output may include pose estimation for the human figures moving in real time. Additionally, for real-time input including RGB images, IR images, depth maps or AB maps, body part segmentation viewable as real-time rendering may be executed and output for the input images.

Figure 11:
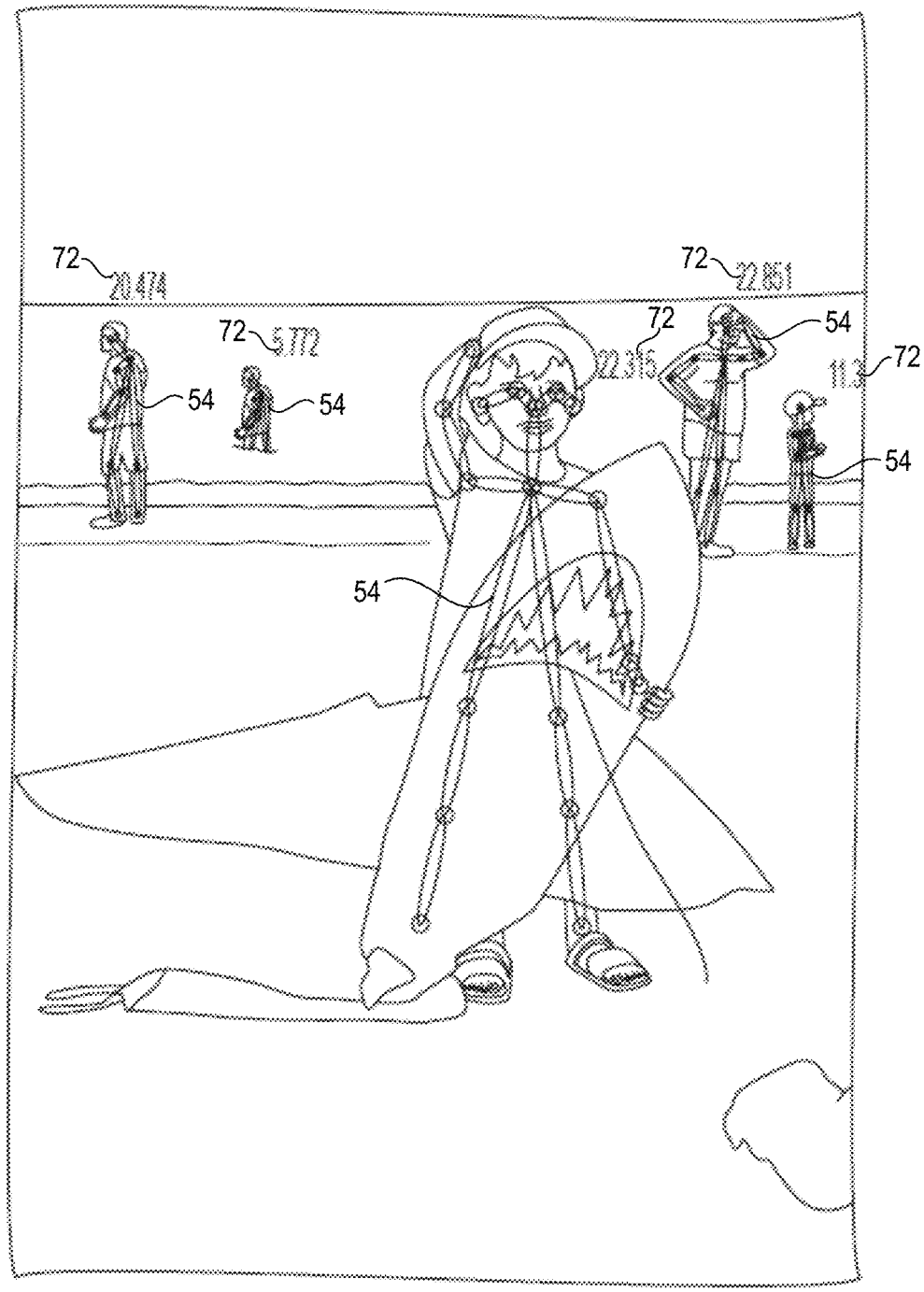
FIG. 11 shows an example output of instances of virtual skeletons in an image according to one example of the present disclosure.
Figure 12:
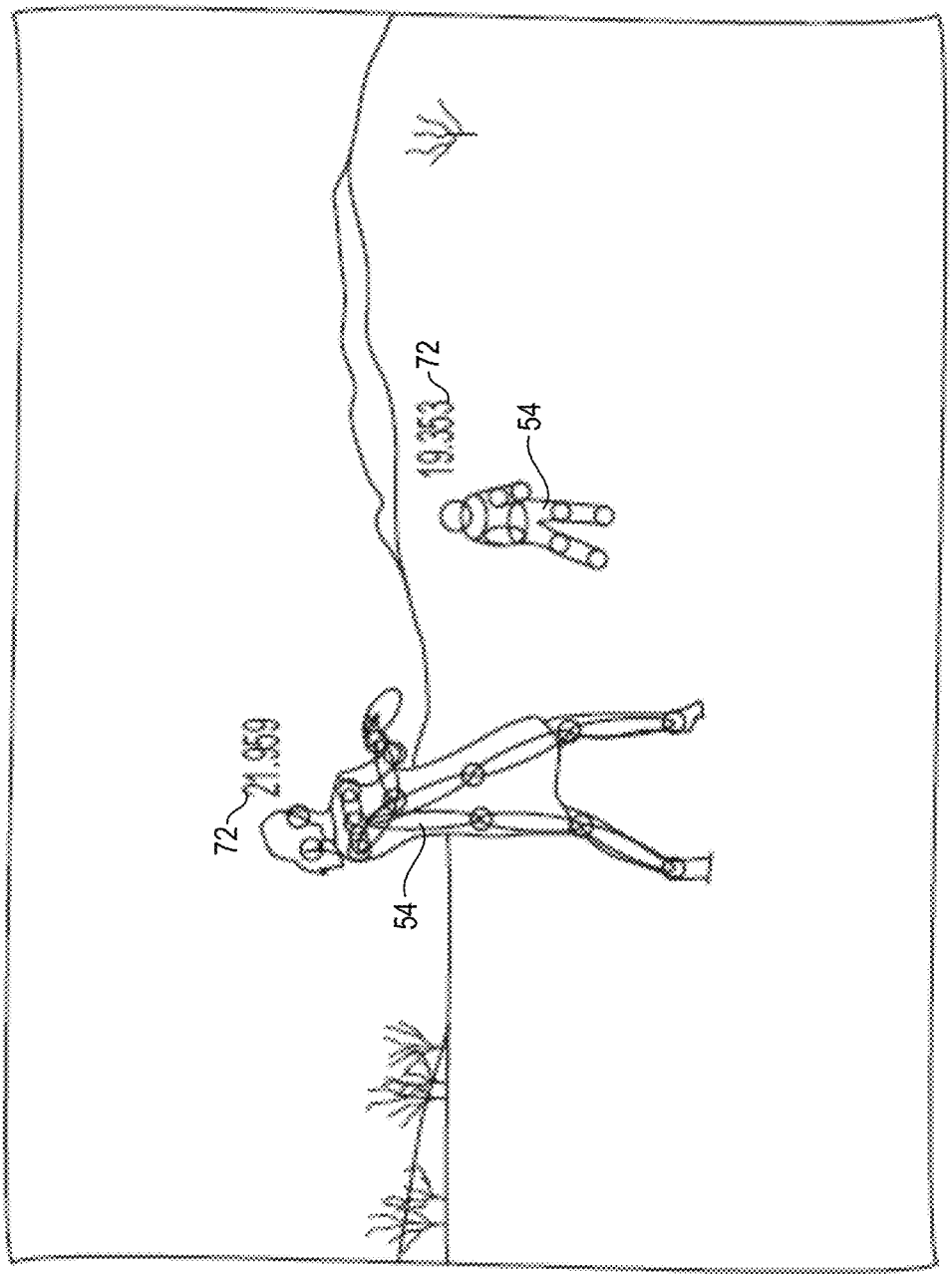
FIG. 12 shows an additional example output of instances of virtual skeletons in an image according to one example of the present disclosure.

FIGS. 11 and 12 show example outputs of instances of grouped virtual skeletons 54 from input images 27. Fitting scores 72 are also displayed in each image for each output skeleton 54. FIG. 11 demonstrates the multi-scale sensitivity of the computing system 10, where figures of different scales may be correctly fit with skeletons 54. As discussed above, a potential advantage of the computing system 10 is that the multi-scale computation may be performed at a single-scale with a single-stage of execution of the neural networks of the computing system 10. FIG. 11 also shows a figure that is occluded in part by an object where the virtual skeleton 54 may still be composed for the occluded human body. FIG. 12 also shows multi-scale calculation of the virtual skeletons 54.

The training data set 60 may include human body part localization and association data and a keypoint dataset. Training may be executed in an end-to-end fashion. The backbone network 42 may be initialized with pre-trained parameters from, for example, the ILSVRC12 dataset; other parameters may be randomly initialized. As mentioned above, the convolutional neural network may be trained for a single stage. However, the neural networks of the computing system 10 may be extended to multi-stage networks for increased accuracy by cascading additional network heads. It will be appreciated that the training executed in the backbone network 42 described herein may have improved efficiency since each layer in the disclosed backbone network 42 may directly receive the gradients back-propagated from the first and second head neural networks 44, 48. Also, concatenating the multi-scale features simultaneously may preserve the semantic information at different scales and enrich the variation of the input of the subsequent head network, which may improve learning efficiency.

Figure 13:
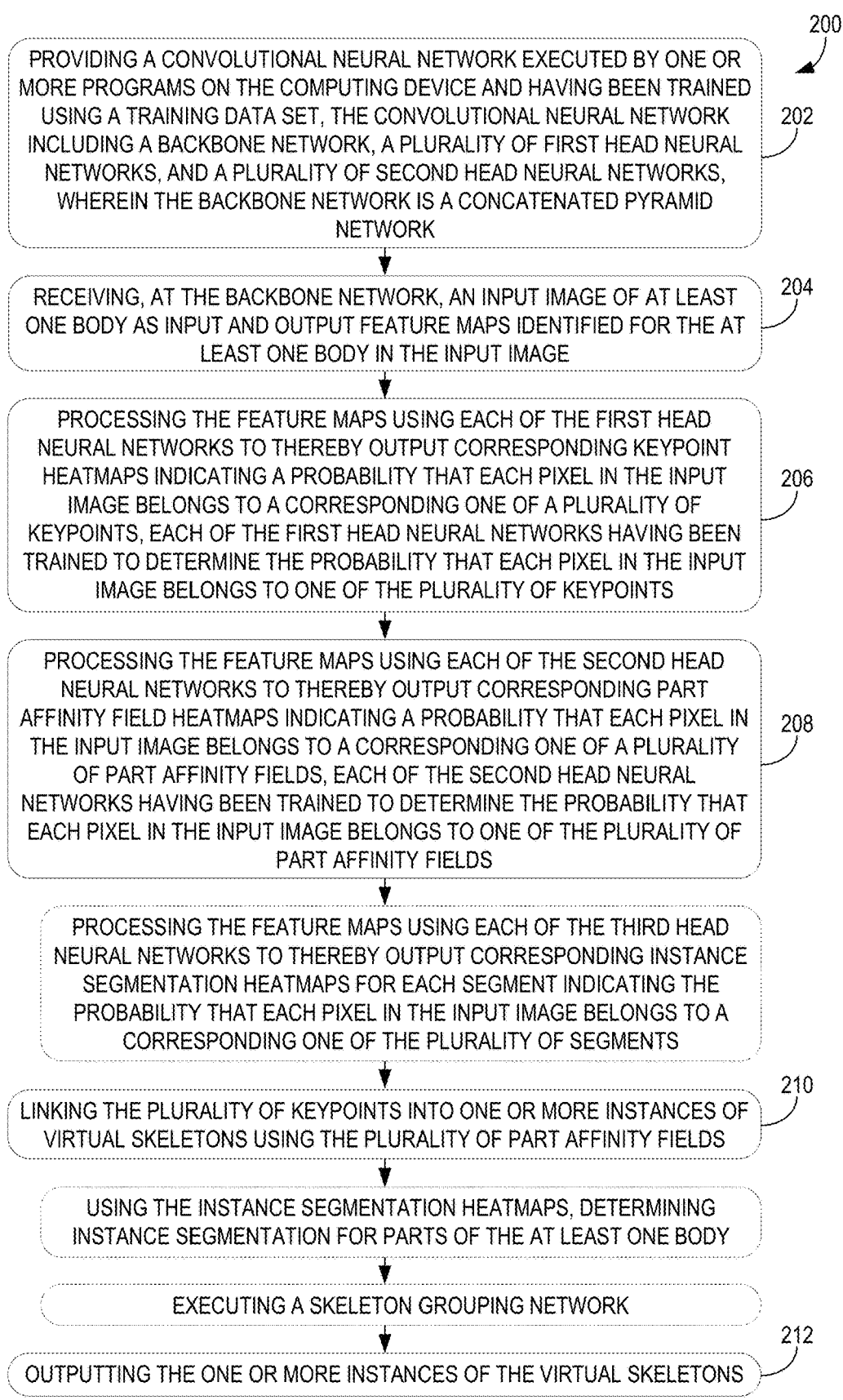
FIG. 13 is a flowchart of a method according to one implementation of the present disclosure.

FIG. 13 shows a flowchart of a method 200 for use with a computing device of the computing system 10. The following description of method 200 is provided with reference to the computing system 10, implementations of which are described above and shown in FIGS. 2 and 8. It will be appreciated that method 200 may also be performed in other contexts using other suitable components.

With reference to FIG. 13, the method 200 may be for use with a computing device 12 including a processor 14. At 202, the method 200 may include providing a CNN executed by one or more programs on the computing device 12, the CNN having been trained using a training data set 60. The CNN may include a backbone network 42, a plurality of first head neural networks 44, and a plurality of second head neural networks 48. The backbone network 42 may be a CCPN, which may be configured with deep pyramid network architecture. The CCPN may include an RNN 56 including a plurality of intermediate layers that may be configured as convolutional neural network layers, as discussed above. The method 200 at 204 may include receiving, at the backbone network 42, an input image 27 as input and outputting feature maps extracted from the input image 27. As the CCPN learns body part localization and association, feature maps may be extracted from input images. Feature maps from the intermediate layers $C_1$ to $C_5$ may be concatenated as input to downstream convolutional layers, as shown in FIG. 3. The plurality of intermediate layers may be connected on a downstream side to a concatenation layer and a plurality of convolutional layers, in this order. The intermediate layers in the CCPN may be concatenated to preserve the information flows between different scales and different levels of semantics.

At 206 the method 200 may include processing the feature maps using each of the first head neural networks 44 to thereby output corresponding keypoint heatmaps 52 indicating a probability that each pixel in the input image 27 belongs to a corresponding one of a plurality of keypoints 46. Each of the first head neural networks 44 may have been trained to determine the probability that each pixel in the input image 27 belongs to one of the plurality of keypoints 46. Keypoints 46 may be associated with corresponding body parts, e.g., shoulders, knees, eyes, hips, etc. Although eight convolutional layers are illustrated in FIG. 3 for the head neural networks, it will be appreciated that the number of convolutional layers that may be implemented is variable. The plurality of first head neural networks 44 and the plurality of second head neural networks 48 may each include a fully convolutional neural network including a plurality of convolutional layers.

The method 200 at 208 may include processing the feature maps using each of the second head neural networks 48 to thereby output corresponding part affinity field heatmaps 64 indicating a probability that each pixel in the input image 27 belongs to a corresponding one of a plurality of part affinity fields 50. The PAFs 50 may determine fields of pixels identified with body segments, as described above. Each of the second head neural networks 48 may have been trained to determine the probability that each pixel in the input image 27 belongs to one of the plurality of part affinity fields 50. At 210, the method 200 may include linking the plurality of keypoints 46 into one or more instances of virtual skeletons 54 using the plurality of part affinity fields 50. The processed keypoint heatmaps 52 with peak sets and the PAF heatmaps 64 may be further processed to determine skeleton linking based on the probabilities associated with pixels of the keypoints 46 and PAFs 50. The method 200 at 212 may include outputting the one or more instances of the virtual skeletons 54. Linking the keypoints 46 may be performed by a greedy algorithm by fitting keypoint locations and part affinity field locations to form each instance of the one or more instances of the virtual skeletons 54. Linking the keypoints 46 may be repeated to maximize a total fitting score 72 for each instance of the one or more instances of the virtual skeletons 54.

The method 200 may further include, as described above, processing the feature maps using the first head neural networks 44 and the second head neural networks 48 executed in parallel, such that the first head neural networks 44 and the second head neural networks 48 run concurrently, in real time. A potential advantage may be that computational time is reduced and the computing system 10 may increase in efficiency. The processor 14 may be configured so that the outputting of the one or more instances of virtual skeletons 54 from the input image 27 received in real time is output in real time. As discussed above, the real-time output may be executed for visible light images, IR images, depth maps or AB maps.

As also described above, a skeleton grouping network 66 may be executed that includes a plurality of fully-connected layers. The skeleton grouping network 66 may be configured to, from the keypoint heatmaps 52 and part affinity field heatmaps 64, group segments 68 of the one or more instances of the virtual skeletons 54. The input image 27 may include overlapping bodies. That is, one or more parts of at least one body may be occluded by at least one additional body in the input image 27. In this case, the skeleton grouping network 66 may be utilized in conjunction with the processor 14 may being configured to receive, as input, a pair of skeletons and output a confidence score indicating a probability that each skeleton in the pair of skeletons belongs to a same body in the input image 27. An output may include a confidence score indicating the likelihood that the input pair of skeletons belongs to the same body. One potential advantage of the computing system 10, as demonstrated in FIG. 8C, is that the skeletons 54 may be individually discerned in spite of the overlapping bodies.

The processor 14 may be configured to execute a plurality of third head neural networks 62 having been trained to determine a probability that each pixel in the input image 27 belongs to one of a plurality of segments 68, as shown in FIG. 9. At the third head neural networks 62, the feature maps output by the backbone network 42 may be processed using each of the third head neural networks 62 to output corresponding instance segmentation maps 70 for each segment 68 indicating the probability that each pixel in the input image 27 belongs to a corresponding one of the plurality of segments 68. It will be appreciated that in this example implementation of computing system 10, not only may pose estimation be accomplished from RGB images, IR images, and depth maps, but body part segmentation may be performed for depth maps and RGB and/or IR images as well. Using the instance segmentation maps 70, the processor 14 may be configured to determine instance segmentation for parts of the at least one body in an input image 27 and output the one or more instances of the virtual skeletons 54 with instance segmentation for parts of the at least one body, as shown in FIG. 10.

The training data set 60 may include human body part localization and association data and a keypoint dataset. Training may be executed in an end-to-end fashion, and may include back-propagation from the first and second head neural networks 44, 48. The convolutional neural network may be trained for a single stage. However, the neural networks of the computing system 10 may be extended to multi-stage networks for increased accuracy by cascading additional network heads.

Rather than requiring multi-stage processing as may be done in known pose estimation methods, the computing system 10 described herein may provide a process for single-stage detection of human skeletons where multi-scale poses in an image may be processed at a single scale, thus potentially decreasing computational cost. These outcomes may be achieved by the implementation of a concatenated pyramid network as a backbone network and parallel head networks that may include convolutional neural networks. Increased precision in outputting virtual skeletons for poses and instance segmentation for parts may be possible, even in real time, through the computing system described herein.

In some embodiments, the methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 14:
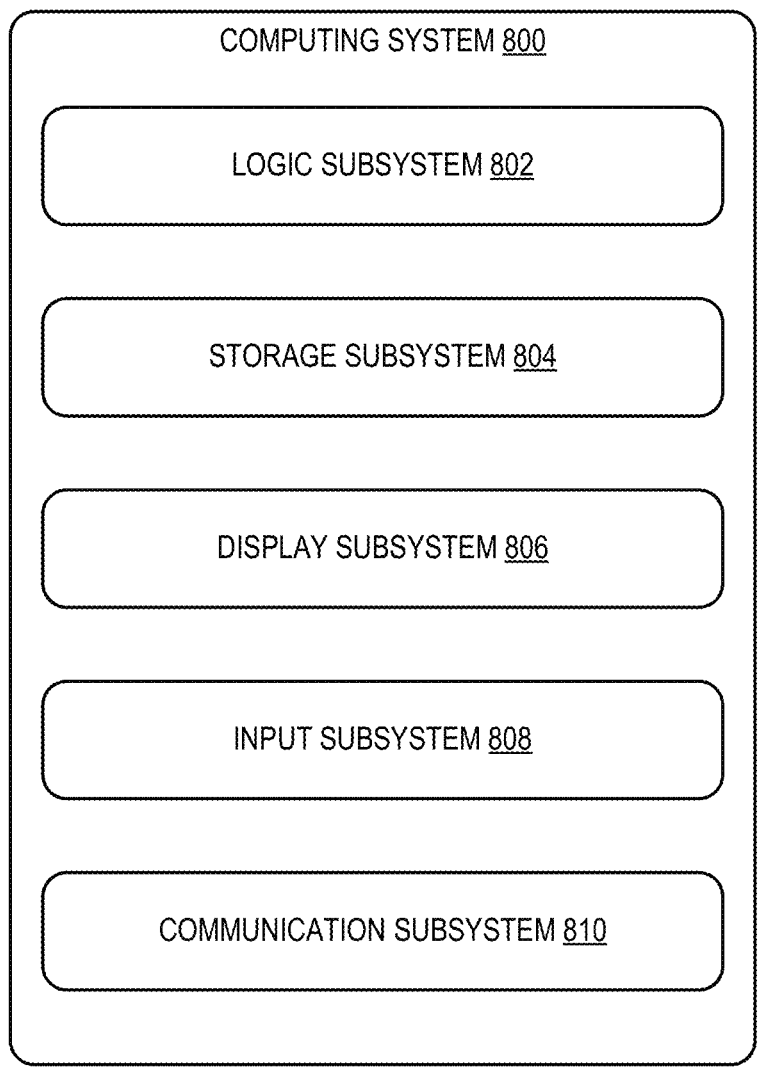
FIG. 14 is an example computing environment, which may be used to implement the computing system of FIG. 1.

FIG. 14 schematically shows a simplified representation of a computing system 800 configured to provide any to all of the compute functionality described herein. Computing system 800 may take the form of one or more virtual/augmented/mixed reality computing devices, personal computers, network-accessible server computers, tablet computers, home-entertainment computers, gaming devices, mobile computing devices, mobile communication devices (e.g., smart phone), wearable computing devices, Internet of Things (IoT) devices, embedded computing devices, and/or other computing devices.

Computing system 800 includes a logic subsystem 802 and a storage subsystem 804. Computing system 800 may optionally include a display subsystem 806, input subsystem 808, communication subsystem 810, and/or other subsystems not shown in FIG. 14.

Logic subsystem 802 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 804 includes one or more physical devices configured to temporarily and/or permanently hold computer information such as data and instructions executable by the logic subsystem. When the storage subsystem includes two or more devices, the devices may be collocated and/or remotely located. Storage subsystem 804 may include volatile, nonvolatile, dynamic, static, read/write, read-only, random-access, sequential-access, location-addressable, file-addressable, and/or content-addressable devices. Storage subsystem 804 may include removable and/or built-in devices. When the logic subsystem executes instructions, the state of storage subsystem 804 may be transformed—e.g., to hold different data.

Aspects of logic subsystem 802 and storage subsystem 804 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 806 may be used to present a visual representation of data held by storage subsystem 804. This visual representation may take the form of a graphical user interface (GUI) including holographic virtual objects. Display subsystem 806 may include one or more display devices utilizing virtually any type of technology. In some implementations, display subsystem 806 may include one or more virtual-, augmented-, or mixed reality displays.

When included, input subsystem 808 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 810 may be configured to communicatively couple computing system 800 with one or more other computing devices. Communication subsystem 810 may include wired and/or wireless communication devices compatible with one or more different communication protocols. The communication subsystem may be configured for communication via personal-, local- and/or wide-area networks.

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user data should only be collected with the utmost respect for user privacy (e.g., user data may be collected only when the user owning the data provides affirmative consent, and/or the user owning the data may be notified whenever the user data is collected). If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate ML and/or AI components, the ML and/or AI components may make decisions based at least partially on training of the components with regard to training data. Accordingly, the ML and/or AI components can and should be trained on diverse, representative datasets that include sufficient relevant data for diverse users and/or populations of users. In particular, training data sets should be inclusive with regard to different human individuals and groups, so that as ML and/or AI components are trained, their performance is improved with regard to the user experience of the users and/or populations of users.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components may be designed to provide context as to how they operate, so that implementers of ML and/or AI systems can be accountable for decisions/assessments made by the systems. For example, ML and/or AI systems may be configured for replicable behavior, e.g., when they make pseudo-random decisions, random seeds may be used and recorded to enable replicating the decisions later. As another example, data used for training and/or testing ML and/or AI systems may be curated and maintained to facilitate future investigation of the behavior of the ML and/or AI systems with regard to the data. Furthermore, ML and/or AI systems may be continually monitored to identify potential bias, errors, and/or unintended outcomes.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

The following paragraphs provide additional support for the claims of the subject application. One aspect provides a computing system comprising a processor and associated memory, the processor being configured to execute one or more programs stored in the memory to execute a convolutional neural network that has been trained using a training data set, the convolutional neural network including a backbone network, a plurality of first head neural networks, and a plurality of second head neural networks, wherein the backbone network is a concatenated pyramid network. At the backbone network, the processor is configured to receive an input image as input and output feature maps extracted from the input image. The processor is configured to process the feature maps using each of the first head neural networks to thereby output corresponding keypoint heatmaps indicating a probability that each pixel in the input image belongs to a corresponding one of a plurality of keypoints, each of the first head neural networks having been trained to determine the probability that each pixel in the input image belongs to one of the plurality of keypoints. The processor is configured to process the feature maps using each of the second head neural networks to thereby output corresponding part affinity field heatmaps indicating a probability that each pixel in the input image belongs to a corresponding one of a plurality of part affinity fields, each of the second head neural networks having been trained to determine the probability that each pixel in the input image belongs to one of the plurality of part affinity fields. The processor is further configured to link the plurality of keypoints into one or more instances of virtual skeletons using the plurality of part affinity fields and output the one or more instances of the virtual skeletons.

In this aspect, additionally or alternatively, processing the feature maps using the first head neural networks and processing the feature maps using the second head neural networks may be executed in parallel such that the first head neural networks and the second head neural networks may run concurrently. In this aspect, additionally or alternatively, the processor may be configured to execute a skeleton grouping network including a plurality of fully-connected layers; the skeleton grouping network may be configured to, from the keypoint heatmaps and part affinity field heatmaps, group segments of the one or more instances of the virtual skeletons. In this aspect, additionally or alternatively, the input image may include overlapping bodies. The processor may be further configured to receive, as input, a pair of skeletons and output a confidence score indicating a probability that each skeleton in the pair of skeletons belongs to a same body in the input image.

In this aspect, additionally or alternatively, the processor may be further configured to execute a plurality of third head neural networks having been trained to determine a probability that each pixel in the input image belongs to one of a plurality of segments; process the feature maps using each of the third head neural networks to thereby output corresponding instance segmentation maps for each segment indicating the probability that each pixel in the input image belongs to a corresponding one of the plurality of segments; using the instance segmentation maps, determine instance segmentation for parts of at least one body; and output the one or more instances of the virtual skeletons with instance segmentation for parts of the at least one body.

In this aspect, additionally or alternatively, the concatenated pyramid network may include a residual neural network that may include a plurality of intermediate layers that may be configured as convolutional neural network layers. The plurality of intermediate layers may be connected on a downstream side to a concatenation layer and a plurality of convolutional layers, in this order. In this aspect, additionally or alternatively, the plurality of first head neural networks and the plurality of second head neural networks may each include a fully convolutional neural network that may include a plurality of convolutional layers.

In this aspect, additionally of alternatively, the input image may be from real-time input received from a visible light camera, a depth camera, or an infrared camera, and the processor may be configured so that the outputting of the one or more instances of virtual skeletons from the input image received in real time may be output in real time. In this aspect, additionally or alternatively, the input image may include one or more of visible light image data, depth data, and active brightness data. In this aspect, additionally or alternatively, linking the keypoints may be performed by a greedy algorithm by fitting keypoint locations and part affinity field locations to form each instance of the one or more instances of the virtual skeletons, and linking the keypoints may be repeated to maximize a total fitting score for each instance of the one or more instances of the virtual skeletons. In this aspect, additionally or alternatively, the training data set may include human body part localization and association data and a keypoint dataset, and the convolutional neural network may be trained for a single stage.

Another aspect provides a computing method for use with a computing device including a processor, comprising providing a convolutional neural network executed by one or more programs on the computing device and having been trained using a training data set, the convolutional neural network including a backbone network, a plurality of first head neural networks, and a plurality of second head neural networks, wherein the backbone network is a concatenated pyramid network. The method further comprises receiving, at the backbone network, an input image as input and outputting feature maps extracted from the input image. The method further comprises processing the feature maps using each of the first head neural networks to thereby output corresponding keypoint heatmaps indicating a probability that each pixel in the input image belongs to a corresponding one of a plurality of keypoints, each of the first head neural networks having been trained to determine the probability that each pixel in the input image belongs to one of the plurality of keypoints. The method further comprises processing the feature maps using each of the second head neural networks to thereby output corresponding part affinity field heatmaps indicating a probability that each pixel in the input image belongs to a corresponding one of a plurality of part affinity fields, each of the second head neural networks having been trained to determine the probability that each pixel in the input image belongs to one of the plurality of part affinity fields. The method further comprises linking the plurality of keypoints into one or more instances of virtual skeletons using the plurality of part affinity fields and outputting the one or more instances of the virtual skeletons.

In this aspect, additionally or alternatively, processing the feature maps using the first head neural networks and processing the feature maps using the second head neural networks may be executed in parallel such that the first head neural networks and the second head neural networks may run concurrently. In this aspect, additionally or alternatively, the method may further comprise executing a skeleton grouping network including a plurality of fully-connected layers. The skeleton grouping network may be configured to, from the keypoint heatmaps and part affinity field heatmaps, group segments of the one or more instances of the virtual skeletons. The input image may include overlapping bodies. The processor may be configured to receive, as input, a pair of skeletons and output a confidence score indicating a probability that each skeleton in the pair of skeletons belongs to a same body in the input image.

In this aspect, additionally or alternatively, the method may further comprise executing a plurality of third head neural networks having been trained to determine a probability that each pixel in the input image belongs to one of a plurality of segments; processing the feature maps using each of the third head neural networks to thereby output corresponding instance segmentation maps for each segment indicating the probability that each pixel in the input image belongs to a corresponding one of the plurality of segments; using the instance segmentation maps, determining instance segmentation for parts of at least one body; and outputting the one or more instances of the virtual skeletons with instance segmentation for parts of the at least one body.

In this aspect, additionally or alternatively, the concatenated pyramid network may include a residual neural network that may include a plurality of intermediate layers that may be configured as convolutional neural network layers. The plurality of intermediate layers may be connected on a downstream side to a concatenation layer and a plurality of convolutional layers, in this order. In this aspect, additionally or alternatively, the plurality of first head neural networks and the plurality of second head neural networks may each include a fully convolutional neural network that may include a plurality of convolutional layers.

In this aspect, additionally or alternatively, the input image may be from real-time input received from a visible light camera, a depth camera, or an infrared camera, and the processor may be configured so that the outputting of the one or more instances of virtual skeletons from the input image received in real time may be output in real time. In this aspect, additionally or alternatively, the training data set may include human body part localization and association data and a keypoint dataset, and the convolutional neural network may be trained for a single stage.

Another aspect provides a computing system comprising a processor and associated memory, the processor being configured to execute one or more programs stored in the memory to execute a convolutional neural network that has been trained using a training data set, the convolutional neural network including a backbone network, a plurality of first head neural networks, and a plurality of second head neural networks, wherein the backbone network is a concatenated pyramid network. At the backbone network, the processor is configured to receive an input image as input and output feature maps extracted from the input image. The processor is configured to process the feature maps using each of the first head neural networks to thereby output corresponding keypoint heatmaps indicating a probability that each pixel in the input image belongs to a corresponding one of a plurality of keypoints, each of the first head neural networks having been trained to determine the probability that each pixel in the input image belongs to one of the plurality of keypoints. The processor is further configured to process the feature maps using each of the second head neural networks to thereby output corresponding part affinity field heatmaps indicating a probability that each pixel in the input image belongs to a corresponding one of a plurality of part affinity fields, each of the second head neural networks having been trained to determine the probability that each pixel in the input image belongs to one of the plurality of part affinity fields. The processor is further configured to link the plurality of keypoints into one or more instances of virtual skeletons using the plurality of part affinity fields. The processor is further configured to execute a skeleton grouping network including a plurality of fully-connected layers, the skeleton grouping network configured to, from the keypoint heatmaps and part affinity field heatmaps, group segments of the one or more instances of the virtual skeletons. The processor is further configured to output the one or more instances of the virtual skeletons, wherein processing the feature maps using the first head neural networks and processing the feature maps using the second head neural networks are executed in parallel such that the first head neural networks and the second head neural networks run concurrently.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
 a processor and associated memory, the processor being configured to execute one or more programs stored in the memory to:
 execute a convolutional neural network that has been trained using a training data set, the convolutional neural network including a backbone network, a plurality of first head neural networks, and a plurality of second head neural networks, wherein the backbone network is a concatenated pyramid network;
 at the backbone network, receive an input image as input and output feature maps extracted from the input image;
 process the feature maps using each of the first head neural networks to thereby output corresponding keypoint heatmaps indicating a probability that each pixel in the input image belongs to a corresponding one of a plurality of keypoints, each of the first head neural networks having been trained to determine the probability that each pixel in the input image belongs to one of the plurality of keypoints;
 process the feature maps using each of the second head neural networks to thereby output corresponding part affinity field heatmaps indicating a probability that each pixel in the input image belongs to a corresponding one of a plurality of part affinity fields, each of the second head neural networks having been trained to determine the probability that each pixel in the input image belongs to one of the plurality of part affinity fields;

link the plurality of keypoints into one or more instances of virtual skeletons using the plurality of part affinity fields; and output the one or more instances of the virtual skeletons.

2. The system of claim 1, wherein processing the feature maps using the first head neural networks and processing the feature maps using the second head neural networks are executed in parallel such that the first head neural networks and the second head neural networks run concurrently.

3. The system of claim 1, further comprising the processor being configured to:

execute a skeleton grouping network including a plurality of fully-connected layers, the skeleton grouping network configured to, from the keypoint heatmaps and part affinity field heatmaps, group segments of the one or more instances of the virtual skeletons.

4. The system of claim 1, wherein the input image includes overlapping bodies, the processor being further configured to receive, as input, a pair of skeletons and output a confidence score indicating a probability that each skeleton in the pair of skeletons belongs to a same body in the input image.

5. The system of claim 1, further comprising the processor being configured to:

execute a plurality of third head neural networks having been trained to determine a probability that each pixel in the input image belongs to one of a plurality of segments;

process the feature maps using each of the third head neural networks to thereby output corresponding instance segmentation maps for each segment indicating the probability that each pixel in the input image belongs to a corresponding one of the plurality of segments;

using the instance segmentation maps, determine instance segmentation for parts of at least one body; and output the one or more instances of the virtual skeletons with instance segmentation for parts of the at least one body.

6. The system of claim 1, wherein the concatenated pyramid network includes a residual neural network including a plurality of intermediate layers that are configured as convolutional neural network layers, the plurality of intermediate layers connected on a downstream side to a concatenation layer and a plurality of convolutional layers, in this order.

7. The system of claim 1, wherein the plurality of first head neural networks and the plurality of second head neural networks each includes a fully convolutional neural network including a plurality of convolutional layers.

8. The system of claim 1, wherein the input image is from real-time input received from a visible light camera, a depth camera, or an infrared camera, and the processor is configured so that the outputting of the one or more instances of virtual skeletons from the input image received in real time is output in real time.

9. The system of claim 1, wherein the input image includes one or more of visible light image data, depth data, and active brightness data.

10. The system of claim 1, wherein linking the keypoints is performed by a greedy algorithm by fitting keypoint locations and part affinity field locations to form each instance of the one or more instances of the virtual skeletons, and linking the keypoints is repeated to maximize a total fitting score for each instance of the one or more instances of the virtual skeletons.

11. The system of claim 1, wherein the training data set includes human body part localization and association data and a keypoint dataset, and the convolutional neural network is trained for a single stage.

12. A computing method for use with a computing device including a processor, comprising:

providing a convolutional neural network executed by one or more programs on the computing device and having been trained using a training data set, the convolutional neural network including a backbone network, a plurality of first head neural networks, and a plurality of second head neural networks, wherein the backbone network is a concatenated pyramid network;

receiving, at the backbone network, an input image as input and outputting feature maps extracted from the input image;

processing the feature maps using each of the first head neural networks to thereby output corresponding keypoint heatmaps indicating a probability that each pixel in the input image belongs to a corresponding one of a plurality of keypoints, each of the first head neural networks having been trained to determine the probability that each pixel in the input image belongs to one of the plurality of keypoints;

processing the feature maps using each of the second head neural networks to thereby output corresponding part affinity field heatmaps indicating a probability that each pixel in the input image belongs to a corresponding one of a plurality of part affinity fields, each of the second head neural networks having been trained to determine the probability that each pixel in the input image belongs to one of the plurality of part affinity fields;

linking the plurality of keypoints into one or more instances of virtual skeletons using the plurality of part affinity fields; and outputting the one or more instances of the virtual skeletons.

13. The computing method of claim 12, wherein processing the feature maps using the first head neural networks and processing the feature maps using the second head neural networks are executed in parallel such that the first head neural networks and the second head neural networks run concurrently.

14. The computing method of claim 12, further comprising:

executing a skeleton grouping network including a plurality of fully-connected layers, the skeleton grouping network configured to, from the keypoint heatmaps and part affinity field heatmaps, group segments of the one or more instances of the virtual skeletons, wherein the input image includes overlapping bodies, the processor being configured to receive, as input, a pair of skeletons and output a confidence score indicating a probability that each skeleton in the pair of skeletons belongs to a same body in the input image.

15. The computing method of claim 12, further comprising:

executing a plurality of third head neural networks having been trained to determine a probability that each pixel in the input image belongs to one of a plurality of segments;

processing the feature maps using each of the third head neural networks to thereby output corresponding instance segmentation maps for each segment indicating the probability that each pixel in the input image belongs to a corresponding one of the plurality of segments;

using the instance segmentation maps, determining instance segmentation for parts of at least one body; and outputting the one or more instances of the virtual skeletons with instance segmentation for parts of the at least one body.

16. The computing method of claim 12, wherein the concatenated pyramid network includes a residual neural network including a plurality of intermediate layers that are configured as convolutional neural network layers, the plurality of intermediate layers connected on a downstream side to a concatenation layer and a plurality of convolutional layers, in this order.

17. The computing method of claim 12, wherein the plurality of first head neural networks and the plurality of second head neural networks each includes a fully convolutional neural network including a plurality of convolutional layers.

18. The computing method of claim 12, wherein the input image is from real-time input received from a visible light camera, a depth camera, or an infrared camera, and the processor is configured so that the outputting of the one or more instances of virtual skeletons from the input image received in real time is output in real time.

19. The computing method of claim 12, wherein the training data set includes human body part localization and association data and a keypoint dataset, and the convolutional neural network is trained for a single stage.

20. A computing system, comprising:

a processor and associated memory, the processor being configured to execute one or more programs stored in the memory to:

execute a convolutional neural network that has been trained using a training data set, the convolutional neural network including a backbone network, a plurality of first head neural networks, and a plurality of second head neural networks, wherein the backbone network is a concatenated pyramid network;

at the backbone network, receive an input image as input and output feature maps extracted from the input image;

process the feature maps using each of the first head neural networks to thereby output corresponding keypoint heatmaps indicating a probability that each pixel in the input image belongs to a corresponding one of a plurality of keypoints, each of the first head neural networks having been trained to determine the probability that each pixel in the input image belongs to one of the plurality of keypoints;

process the feature maps using each of the second head neural networks to thereby output corresponding part affinity field heatmaps indicating a probability that each pixel in the input image belongs to a corresponding one of a plurality of part affinity fields, each of the second head neural networks having been trained to determine the probability that each pixel in the input image belongs to one of the plurality of part affinity fields;

link the plurality of keypoints into one or more instances of virtual skeletons using the plurality of part affinity fields;

execute a skeleton grouping network including a plurality of fully-connected layers, the skeleton grouping network configured to, from the keypoint heatmaps and part affinity field heatmaps, group segments of the one or more instances of the virtual skeletons; and output the one or more instances of the virtual skeletons, wherein processing the feature maps using the first head neural networks and processing the feature maps using the second head neural networks are executed in parallel such that the first head neural networks and the second head neural networks run concurrently.

* * * * *